(12) United States Patent
Kotlar

(10) Patent No.: US 7,964,539 B2
(45) Date of Patent: Jun. 21, 2011

(54) WELL TREATMENT

(75) Inventor: Hans Kristian Kotlar, Stavanger (NO)

(73) Assignee: Statoil ASA, Stavanger (NO)

(*) Notice: Subject to any disclaimer, the term of this patent is extended or adjusted under 35 U.S.C. 154(b) by 231 days.

(21) Appl. No.: 11/629,636

(22) PCT Filed: Jun. 17, 2005

(86) PCT No.: PCT/GB2005/002385
§ 371 (c)(1), (2), (4) Date: May 1, 2007

(87) PCT Pub. No.: WO2005/124099
PCT Pub. Date: Dec. 29, 2005

(65) Prior Publication Data
US 2007/0254814 A1 Nov. 1, 2007

(30) Foreign Application Priority Data

Jun. 17, 2004 (GB) ................................ 0413584.4
Oct. 29, 2004 (GB) ................................ 0424085.9
Feb. 2, 2005 (GB) ................................ 0502171.2

(51) Int. Cl.
*C09K 8/60* (2006.01)
*C02F 5/08* (2006.01)
*E21B 43/22* (2006.01)
*E21B 43/16* (2006.01)
*E21B 43/26* (2006.01)

(52) U.S. Cl. ........ 507/233; 507/234; 507/201; 166/246; 166/268; 166/270.2; 166/305.1

(58) Field of Classification Search .................. 507/201, 507/233, 234, 210; 166/246, 268, 270.2, 166/305.1
See application file for complete search history.

(56) References Cited

U.S. PATENT DOCUMENTS

| | | | |
|---|---|---|---|
| 2,633,919 A | 4/1953 | Bauer et al. ................ 166/21 |
| 2,832,754 A | 4/1958 | Jex et al. | |
| 2,935,475 A | 5/1960 | Bernard ................ 252/8.55 |
| 2,939,839 A | 6/1960 | Brukner ................ 252/8.55 |
| 2,975,835 A | 3/1961 | Bond | |
| 3,199,590 A | 8/1965 | Young ................ 166/295 |
| 3,250,330 A | 5/1966 | Smith, Jr. | |
| 3,286,770 A | 11/1966 | Knox et al. ................ 166/42 |
| 3,294,166 A | 12/1966 | Havenaar et al. | |
| 3,364,994 A | 1/1968 | Sterrett ................ 166/270.2 |
| 3,552,493 A | 1/1971 | Bezemer ................ 166/295 |
| 3,615,794 A * | 10/1971 | Nimerick ................ 523/130 |
| 3,625,287 A | 12/1971 | Young ................ 166/295 |
| 4,074,536 A | 2/1978 | Young ................ 61/36 |
| 4,120,842 A | 10/1978 | Harnsberger ................ 260/33.6 |
| 4,384,044 A | 5/1983 | Kim et al. | |
| 4,417,623 A | 11/1983 | Anthony ................ 166/294 |
| 4,479,543 A | 10/1984 | Kalfayan et al. ................ 166/300 |
| 4,498,538 A | 2/1985 | Watkins et al. ................ 166/295 |
| 4,506,044 A | 3/1985 | Cox et al. | |
| 4,530,956 A | 7/1985 | Ugelstad et al. | |
| 4,549,609 A | 10/1985 | Watkins et al. ................ 166/303 |
| 4,580,633 A | 4/1986 | Watkins et al. ................ 166/295 |
| 4,646,835 A | 3/1987 | Watkins et al. ................ 166/295 |
| 4,660,642 A | 4/1987 | Young ................ 166/280.2 |
| 4,689,085 A * | 8/1987 | Plueddemann ................ 106/287.14 |
| 4,708,207 A | 11/1987 | Kalfayan et al. ................ 166/295 |
| 4,743,545 A | 5/1988 | Torobin | |
| 4,787,453 A | 11/1988 | Hewgill et al. ................ 166/2 |
| 4,846,981 A | 7/1989 | Brost | |
| 4,850,745 A | 7/1989 | Hater et al. | |
| 4,905,761 A | 3/1990 | Bryant | |
| 4,938,287 A | 7/1990 | Friedman et al. ................ 166/288 |
| 5,043,364 A | 8/1991 | Moradi-Araghi et al. ................ 523/130 |
| 5,083,611 A | 1/1992 | Clark et al. | |
| 5,129,458 A | 7/1992 | King et al. ................ 166/295 |
| 5,163,510 A | 11/1992 | Sunde | |
| 5,169,561 A | 12/1992 | Gentle et al. ................ 252/321 |
| 5,250,201 A | 10/1993 | Shilo et al. | |
| 5,297,625 A | 3/1994 | Premuzic et al. | |
| 5,337,820 A | 8/1994 | Jenneman et al. | |
| 5,376,183 A | 12/1994 | Gatt et al. | |
| 5,379,841 A | 1/1995 | Pusch et al. ................ 166/295 |
| 5,530,095 A | 6/1996 | Vaughn et al. | |
| 5,701,956 A | 12/1997 | Hardy et al. ................ 166/295 |

(Continued)

FOREIGN PATENT DOCUMENTS

CN 1472157 2/2004

(Continued)

OTHER PUBLICATIONS

Fenn L.B., Taylor R.M., and Matocha J.E., Ammonia Losses from Surface-Applied Nitrogen Fertilizer as Controlled by Soluble Calcium and Magnesium: General Theory. Soil Science Society of American Journal 45: 777-781 (1981).*
Research Disclosure Journal, "Method for the consolidation of incompetent formations," Anonymously Disclosed, Jan. 1995.
International Preliminary Report on Patentability for International Patent Application No. PCT/GB2005/002390 (completed May 30, 2006).
International Preliminary Report on Patentability for International Patent Application No. PCT/GB2006/001524 (issued Oct. 30, 2007).
International Search Report for International Patent Application No. PCT/GB2005/002390 (mailed Nov. 18, 2005).

(Continued)

*Primary Examiner* — Timothy J. Kugel
*Assistant Examiner* — Atnaf Admasu
(74) *Attorney, Agent, or Firm* — Ballard Spahr LLP

(57) ABSTRACT

This invention provides a method of controlling water in a subterranean formation, said method comprising contacting said formation with a water control treatment agent which comprises an organosilane in an amount effective to reduce the water permeability of at least part of said formation. At the same time, any decrease in the overall hydrocarbon (e.g. oil) permeability of said formation is preferably minimized. The invention further provides a method of plugging or sealing a subterranean formation.

28 Claims, 3 Drawing Sheets

U.S. PATENT DOCUMENTS

| | | | |
|---|---|---|---|
| 5,735,349 A | 4/1998 | Dawson et al. | 166/295 |
| 5,806,593 A | 9/1998 | Surles | 166/270 |
| 6,024,791 A | 2/2000 | Sonoda et al. | 106/714 |
| 6,169,058 B1 | 1/2001 | Le et al. | 507/222 |
| 6,210,476 B1 | 4/2001 | Chatterji et al. | 106/677 |
| 6,228,812 B1 | 5/2001 | Dawson et al. | 507/221 |
| 6,401,819 B1 | 6/2002 | Harris et al. | |
| 6,474,413 B1 | 11/2002 | Barbosa et al. | 166/270 |
| 6,476,169 B1 | 11/2002 | Eoff et al. | 526/307.2 |
| 6,702,044 B2 | 3/2004 | Reddy et al. | 175/64 |
| 7,325,603 B2 | 2/2008 | Kotlar | |
| 2002/0104651 A1 | 8/2002 | McClung | |
| 2002/0123433 A1 | 9/2002 | Goodhue, Jr. et al. | 507/140 |
| 2003/0131764 A1 | 7/2003 | Lessard et al. | 106/817 |
| 2003/0216263 A1 | 11/2003 | Tibbles et al. | |
| 2004/0177957 A1 | 9/2004 | Kalfayan et al. | 166/270 |
| 2005/0173116 A1 | 8/2005 | Nguyen et al. | 166/280.2 |
| 2007/0158070 A1 | 7/2007 | Endres et al. | 166/294 |

FOREIGN PATENT DOCUMENTS

| | | |
|---|---|---|
| EP | 0 003 905 | 9/1979 |
| EP | 0 224346 | 3/1986 |
| EP | 0 187 092 | 7/1986 |
| EP | 0 193 369 | 9/1986 |
| EP | 0 265563 | 10/1986 |
| EP | 0 266043 | 4/1988 |
| EP | 0 365 390 | 4/1990 |
| EP | 0 656 459 | 6/1995 |
| EP | 0 692 464 | 1/1996 |
| EP | 1 235 974 | 1/2005 |
| GB | 1 021528 | 3/1966 |
| GB | 1 022742 | 3/1966 |
| GB | 1 511589 | 5/1978 |
| GB | 2 222 420 | 3/1990 |
| GB | 2 290 096 | 12/1995 |
| GB | 2 377 930 | 1/2003 |
| GB | 2 387 613 | 10/2003 |
| GB | 2 399 364 | 9/2004 |
| GB | 2 425 531 | 11/2006 |
| KR | 20020044733 | 6/2002 |
| KR | 20030071279 | 9/2003 |
| SU | 1025868 | 6/1983 |
| SU | 1661379 | 7/1991 |
| WO | WO 88/00948 | 2/1988 |
| WO | WO 92/17413 | 10/1992 |
| WO | WO 96/27070 | 9/1996 |
| WO | WO 97/45625 | 12/1997 |
| WO | WO98/27314 | 6/1998 |
| WO | WO 99/03666 | 1/1999 |
| WO | WO 99/19375 | 4/1999 |
| WO | WO 99/54592 | 10/1999 |
| WO | WO 01/34939 | 5/2001 |
| WO | WO 02/095187 | 11/2002 |
| WO | WO 03/010107 | 2/2003 |
| WO | WO 03/087010 | 10/2003 |
| WO | WO 2005/005773 | 1/2005 |
| WO | WO 2005/073278 | 2/2005 |
| WO | WO 2005/024175 | 3/2005 |
| WO | WO 2005/124099 | 12/2005 |
| WO | WO 2005/124100 | 12/2005 |
| WO | WO 2006/114623 | 11/2006 |
| WO | WO 2006/118467 | 11/2006 |
| WO | WO 2007/033489 | 3/2007 |
| WO | WO 2009/001098 | 12/2008 |
| WO | WO 2009/027680 | 3/2009 |

OTHER PUBLICATIONS

International Search Report for International Patent Application No. PCT/GB2006/001524 (mailed Oct. 13, 2006).

International Search Report for International Patent Application No. PCT/GB2008/002912 (mailed Dec. 8, 2008).

Lea, *The Chemistry of Cement and Concrete* 31, 121, 132, 416, 560, 621, 657 (3d ed. 1970).

Saasen, et al., "The Use of Blast Furnace Slag in North Sea Cementing Applications," SPE28821, pp. 143-153, Proceedings, European Petroleum Conference, London, UK (Oct. 25-27, 1994).

Written Opinion for International Patent Application No. PCT/GB2005/002385 (mailed Nov. 18, 2005).

Written Opinion for International Patent Application No. PCT/GB2005/002390 (mailed Nov. 18, 2005).

Written Opinion for International Patent Application No. PCT/GB2006/001524 (mailed Oct. 13, 2006).

Cannio et al. (1998) An autonomously replicating transforming vector for *Sulfolobus solfataricus*. J. Bacteriol., 180(12): 3237-3240.

Collins IR. Scale Inhibition by Poly(amino acids). Shared Petrotechnical Resource, Chertsey Road, Sunbury-on-Thames, Middlesex T16 7LN.

Ornek et al. (2002) Pitting corrosion inhibition of aluminum 2024 by *Bacillius* biofilms secreting polyaspartate or gamma-polyglutamate. Appl. Microbiol, Biotechnol., 58(5): 651-657.

McGovern-Traa et al. (1997) Petroleum Geology of the Irish Sea and Adjacent areas. Geological Society Special publication, 124: 229-236.

Search Report issued Oct. 1, 2007 for GB 0712395.3, which was filed Jun. 26, 2007 (Applicant—Statoilhydro Asa; Inventor—H.K. Kotlar).

International Search Report issued on Nov. 18, 2005 for PCT/GB2005/002385, which was filed on Jun. 17, 2005 and published as WO 2005/124099 on Dec. 29, 2005 (Applicant—Statoil Asa; Inventor—H.K. Kotlar).

International Preliminary Report on Patentability issued on Apr. 3, 2006 for PCT/GB2005/002385, which was filed on Jun. 17, 2005 and published as WO 2005/124099 on Dec. 29, 2005 (Applicant—Statoil Asa; Inventor—H.K. Kotlar).

Response after Non-Final Action filed Nov. 29, 2010 in U.S. Appl. No. 11/919,367, filed Apr. 26, 2006 (Inventors: Godoy et al.).

Non-Final Rejection issued May 27, 2010 in U.S. Appl. No. 11/919,367, filed Apr. 26, 2006 (Inventors: Godoy et al.).

Preliminary Amendment filed Oct. 25, 2007 in U.S. Appl. No. 11/919,367, filed Apr. 26, 2006 (Inventors: Godoy et al.).

Restriction Requirement issued Dec. 27, 2010 in U.S. Appl. No. 12/452,259, filed Jun. 26, 2008 (Inventors: H.K. Kotlar).

Preliminary Amendment filed Dec. 22, 2009 in U.S. Appl. No. 12/452,259, filed Jun. 26, 2008 (Inventors: H.K. Kotlar).

International Search Report issued Mar. 4, 2009 for PCT/GB2008/002209, which was filed on Jun. 26, 2008 and published as WO 2009/001098 on Dec. 31, 2008 (Inventor—H.K. Kotlar; Applicant—Statoilhydro Asa).

International Preliminary Report on Patentability issued Jun. 24, 2009 for PCT/GB2008/002209, which was filed on Jun. 26, 2008 and published as WO 2009/001098 on Dec. 31, 2008 (Inventor—H.K. Kotlar; Applicant—Statoilhydro Asa).

Written Opinion issued Dec. 26, 2009 for PCT/GB2008/002209, which was filed on Jun. 26, 2008 and published as WO 2009/001098 on Dec. 31, 2008 (Inventor—H.K. Kotlar; Applicant—Statoilhydro Asa).

Issue Notification issued Jan. 16, 2008 in U.S. Appl. No. 10/478,776, which was filed May 21, 2002 (Inventors: Kotlar et al.).

Supplemental Notice of Allowance issued Nov. 30, 2007 in U.S. Appl. No. 10/478,776, filed May 21, 2002 (Inventors: Kotlar et al.).

Notice of Allowance issued Aug. 30, 2007 in U.S. Appl. No. 10/478,776, filed May 21, 2002 (Inventors: Kotlar et al.).

Summary of Examiner Interview issued Aug. 30, 2007 in U.S. Appl. No. 10/478,776, filed May 21, 2002 (Inventors: Kotlar et al.).

Response after Non-Final Office Action filed Jul. 10, 2007 in U.S. Appl. No. 10/478,776, filed May 21, 2002 (Inventors: Kotlar et al.).

Non-Final Rejection issued Jan. 12, 2007 in U.S. Appl. No. 10/478,776, filed May 21, 2002 (Inventors: Kotlar et al.).

Response after Final Office Action filed Dec. 22, 2006 in U.S. Appl. No. 10/478,776, filed May 21, 2002 (Inventors: Kotlar et al.).

Final Rejection issued Jun. 23, 2006 in U.S. Appl. No. 10/478,776, filed May 21, 2002 (Inventors: Kotlar et al.).

Response after Non-Final Office Action filed Mar. 27, 2006 in U.S. Appl. No. 10/478,776, filed May 21, 2002 (Inventors: Kotlar et al.).

Non-Final Rejection issued Sep. 27, 2005 in U.S. Appl. No. 10/478,776, filed May 21, 2002 (Inventors: Kotlar et al.).

Preliminary Amendment filed Nov. 21, 2003 in U.S. Appl. No. 10/478,776, filed May 21, 2002 (Inventors: Kotlar et al.).

International Preliminary Report on Patentability issued on Sep. 12, 2003 for PCT/GB02/023359, which was filed on May 21, 2002 and published as WO 02/095187 on Nov. 28, 2002 (Applicant—Statoil Asa; Inventor—Kotlar et al. ).

International Search Report issued on Mar. 10, 2003 for PCT/GB02/023359, which was filed on May 21, 2002 and published as WO 02/095187 on Nov. 28, 2002 (Applicant—Statoil Asa; Inventor—Kotlar et al. ).

International Preliminary Report on Patentability issued on May 30, 2006 for PCT/GB2005/02390, which was filed on Jun. 17, 2005 and published as WO 2005/124100 on Dec. 29, 2005 (Applicant—Statoil Asa; Inventor—Kotlar et al. ).

Response after Final Office Action filed May 27, 2010 in U.S. Appl. No. 11/629,729, filed Jun. 17, 2005 (Inventors: Kotlar et al.).

Final Office Action issued Jan. 27, 2010 in U.S. Appl. No. 11/629,729, filed Jun. 17, 2005 (Inventors: Kotlar et al.).

Response after Non-Final Office Action filed Nov. 12, 2009 in U.S. Appl. No. 11/629,729, filed Jun. 17, 2005 (Inventors: Kotlar et al.).

Non-Final Office Action issued May 12, 2009 in U.S. Appl. No. 11/629,729, filed Jun. 17, 2005 (Inventors: Kotlar et al.).

Response after Non-Final Office Action filed Jan. 9, 2009 in U.S. Appl. No. 11/629,729, filed Jun. 17, 2005 (Inventors: Kotlar et al.).

Non-Final Office Action issued Jul. 9, 2008 in U.S. Appl. No. 11/629,729, filed Jun. 17, 2005 (Inventors: Kotlar et al.).

Response to Restriction Requirement filed May 19, 2008 in U.S. Appl. No. 11/629,729, filed Jun. 17, 2005 (Inventors: Kotlar et al.).

Restriction Requirement issued Mar. 19, 2008 in U.S. Appl. No. 11/629,729, filed Jun. 17, 2005 (Inventors: Kotlar et al.).

Preliminary Amendment filed Dec. 5, 2006 in U.S. Appl. No. 11/629,729, filed Jun. 17, 2005 (Inventors: Kotlar et al.).

International Preliminary Report on Patentability issued on Mar. 2, 2010 for PCT/GB2008/002912, which was filed on Aug. 29, 2008 and published as Mar. 5, 2009 on WO 2009/027680 (Applicant—Statoil Asa; Inventors—Kotlar et al).

Written Opinion issued on Feb. 28, 2008 for PCT/GB2008/002912, which was filed on Aug. 29, 2008 and published as Mar. 5, 2009 on WO 2009/027680 (Applicant—Statoil ASA; Inventors—Kotlar et al).

200802357, Oct. 26, 2009, Eurasian Search Report.

First Office Action issued Dec. 18, 2000 for CN 200680014248.7 (Applicant—Statoilhydro Asa; Inventor—Godoy et al.).

* cited by examiner

WELL TREATMENT

CROSS REFERENCE TO RELATED APPLICATIONS

The present application claims priority to Great Britain Application No. 0413584.4, filed Jun. 17, 2004, Great Britain Application No. 0424085.9, filed Oct. 29, 2004, and Great Britain Application No. 0502171.2, filed Feb. 2, 2005, which applications are incorporated herein fully by this reference.

This invention relates to a method of modifying the permeability of subterranean formations and, more specifically, to a method for reducing the water permeability of such formations. In particular, the invention concerns a method for selectively reducing the production of aqueous fluids (e.g. water) from hydrocarbon-producing formations. The invention also provides a method for plugging or sealing water-rich subterranean formations.

Hydrocarbons (e.g. oil and gas) are generally recovered from subterranean formations by drilling a well bore into the formation and extracting the hydrocarbon. One of the factors which influences the rate of hydrocarbon production and therefore the productivity of the well is the ratio of hydrocarbon to water which is produced from the formation.

The production of water and other aqueous fluids from subterranean formations is a common phenomenon, particularly with mature wells and a certain level of water production is in fact necessary for the efficient extraction of hydrocarbon. The water produced may be, for example, water that is injected into the well to facilitate recovery of the hydrocarbon. Alternatively or, additionally, the water may be "formation water" (i.e. that which is naturally present in the formation).

As the hydrocarbons are extracted from a formation, water and aqueous fluids tend to move through the pore system in the formation and into the well bore where they are produced along with the hydrocarbon. In fact as water is less viscous than hydrocarbon, it has a greater ability to flow and may therefore channel around the oil into the well bore. Other mechanisms that tend to result in water production include "coning" into the well bore from a water column and movement of water through different strata of the formation.

Excessive production of water and other aqueous fluids (i.e. the production of more water and/or aqueous fluids than is necessary for efficient production of hydrocarbon) from wells causes a number of problems. Aside from leading to a reduction in the rate of hydrocarbon production, water production can result in scaling of downhole equipment (e.g. pipelines, valves, sand screens, etc.) as well as surface facilities. Repair or replacement of such equipment can only be carried out during periods of shut-down in production which has a significant economic impact on the production process. Excessive production of water further increases the cost of recovering the hydrocarbon in a form suitable for transportation and/or further refining. In particular, the over-production of water necessitates the use of expensive equipment to separate the water and other aqueous fluids from the hydrocarbon. The costs associated with disposal of produced water in an environmentally safe, manner causes further economic drawbacks.

Typically, in hydrocarbon-producing formations the amount of water produced increases over the lifetime of the well. Thus, when production first begins, very little excess water may be produced but the ratio of produced water to hydrocarbon tends to increase over time. As a result, a point is reached at which the cost of handling the volume of water produced during hydrocarbon production becomes greater than the value of the hydrocarbon recovered. At this point, the well bore may be described as "watered-out" (i.e. it essentially becomes uneconomical to work). Thus, although hydrocarbon material may still remain in a "watered-out" well reservoir zone, it can no longer be extracted economically.

A number of methods for controlling water production from subterranean formations have been proposed. These include processes designed to block pores or channels within a formation by, for example, gellation using polymer materials such as polyvinyl alcohol and polyacrylic acid. Another method that has been proposed involves introducing a barrier, such as a concrete resin, adjacent to the well bore in order to prevent the movement of water into the bore. Such treatments can in some cases provide a desired level of water control by effectively blocking water producing channels and pores. These methods are not, however, selective to water producing channels and also tend to block those channels and pores facilitating hydrocarbon production. Thus, unless zonal isolation methods are used during delivery of the treatment chemicals, the rate of hydrocarbon production also tends to be drastically reduced as it becomes difficult for hydrocarbon to reach the well bore (i.e. the permeability of the formation to hydrocarbon is also decreased). Use of zonal isolation methods to overcome this problem is, however, both expensive and time-consuming. It also necessitates the use of specialized equipment.

More recently, methods to achieve selective water control without the need for zonal isolation techniques have been proposed. These methods typically involve introducing a composition comprising a hydrophilic polymer (e.g. a polyacrylamide) into the formation. Whilst the size of the polymer impedes the movement of fluids (e.g. water) in the formation, it is thought that the hydrophilicity of the polymer affords the desired selectivity. More specifically, it is believed that the hydrophilic nature of the polymer materials causes these to preferentially partition into those channels and pores of the formation which contain high levels of water.

GB-A-2399364, for example, discloses compositions for selectively reducing the production of water from subterranean formations which comprise a relative permeability modifier (RPM) macromolecule and an organosilicon compound. The RPM is a polymer such as polyacrylamide which can be introduced into the formation to impede the production of water. The organosilicon compound is used to bind the RPM to the surfaces of the formation (i.e. it acts as a linker or bridging molecule).

The use of hydrophilic polymers such as polyacrylamides is not, however, without its disadvantages. One drawback is that the polymers tend to have only limited retention time in the formation. Despite suggestions for improving their retention (e.g. the use of organosilicon compounds as disclosed in GB-A-2399364), it is still the case that formations often have to be re-treated with further polymer material after a relatively short period of time. It is also not uncommon for a reduction in hydrocarbon production to be associated with the use of such polymers since at least a proportion of these locate into primarily hydrocarbon-producing channels or pores thereby blocking the production of hydrocarbon (e.g. oil).

A further disadvantage associated with the use of polymer materials to control water production arises from the fact that they are often at least partially unstable at high temperatures (e.g. greater than 110° C.) as well as in acids and heavy brines which are commonly used in hydrocarbon production. Exposure to such temperatures and/or chemicals can cause the polymers to decompose and/or degrade thereby nullifying their blocking effect. When this occurs, the formation then has to be re-treated thus further increasing costs. Moreover, polyacrylamide is potentially damaging to the environment (the acrylamide monomer produced on decomposition of polyacrylamide is a nerve toxin).

There is thus a continuing need for alternative (e.g. improved) methods for controlling water flow in subterranean formations, especially during the production of hydrocarbon (e.g. oil) from a well and, in particular, for methods which are capable of reducing the volume of water produced during hydrocarbon recovery. More particularly, a need exists for such methods that are capable of selectively reducing the production of aqueous fluids (e.g. water) from hydrocarbon-producing formations, i.e. methods in which the production of water is reduced or eliminated without substantially affecting the production of hydrocarbon.

Figure 1A:
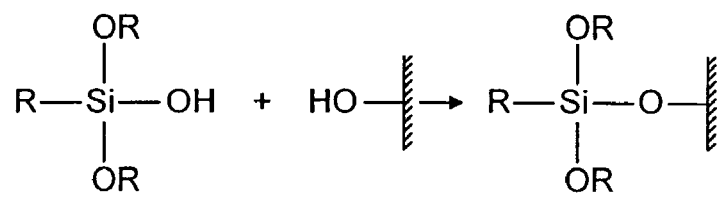
FIG. 1a illustrates the reaction of a silanol molecule with the surface of a hydrocarbon formation to covalently bond the organosilane to particles comprising the formation.

Surprisingly, we have now found that the flow of water in a subterranean formation, e.g. the production of water from such a formation, can effectively be controlled by a water control treatment agent comprising an organosilane. In particular, we have found that an organosilane is capable of selectively reducing the production of aqueous fluids (e.g. water) from a hydrocarbon-producing well without adversely affecting the recovery of hydrocarbon.

Viewed from one aspect the present invention thus provides a method of controlling water in a subterranean formation, said method comprising contacting said formation with a water control treatment agent which comprises (e.g. consists essentially of) an organosilane in an amount effective to reduce the water permeability of at least part of said formation. In a preferred embodiment of the method of the invention any decrease in the overall hydrocarbon (e.g. oil) permeability of said formation is minimized.

Viewed from another aspect the invention provides the use of a water control treatment agent comprising (e.g. consisting essentially of) an organosilane in a method of controlling water in a subterranean formation, said method comprising contacting said formation with said agent in an amount effective to reduce the water permeability of at least part of said formation, preferably whilst minimizing any decrease in the overall hydrocarbon (e.g. oil) permeability of said formation.

Viewed from a still further aspect the invention provides the use of an organosilane as a water control treatment agent (e.g. as the sole water control treatment agent) to control water in a subterranean formation wherein said agent is effective to reduce the water permeability of at least part of said formation, preferably whilst minimizing any decrease in the overall hydrocarbon (e.g. oil) permeability of said formation.

Viewed from a yet still further aspect the invention provides a water control treatment agent comprising (e.g. consisting essentially of) an organosilane in an amount effective to control water in a subterranean formation, e.g. by reducing the water permeability of at least part of said formation, preferably whilst minimizing any decrease in the overall hydrocarbon (e.g. oil) permeability of said formation.

As used herein, the term "permeability" refers to the capacity of a porous medium to transmit a fluid. It therefore provides a measure of the resistance of a formation to flow of a liquid (e.g. water and/or hydrocarbon) through the pores and channels forming its structure. Thus, "hydrocarbon permeability" means the capacity of a porous medium such as a subterranean formation to transmit hydrocarbon (e.g. oil) and. "water permeability" means the corresponding capacity to transmit water.

Permeability may be measured using Darcy's Law:

$$Q = k \cdot \Delta P \cdot A / \mu L$$

where
Q=flow rate ($cm^3/s$)
$\Delta P$=pressure drop (atm) across a cylinder having a length L (cm) and a cross-sectional area A ($cm^2$)
m=fluid viscosity (cp)
k=permeability (Darcy)

In the method of the present invention, the permeability to water of at least part of the formation is reduced. At the same time, the overall hydrocarbon permeability of the formation may also be reduced. Preferably, however, the hydrocarbon permeability is reduced to a lesser extent (e.g. 50% less, more preferably 70% less) than the water permeability. In any case, hydrocarbon present in the formation may still be extracted therefrom more economically than prior to treatment as a result of the decrease in water production. It should also be noted that the method of the present invention may, for example, be combined with the use of a higher draw down in order to compensate for any decrease in the hydrocarbon permeability of the formation.

In a preferred embodiment of the method of the present invention, the permeability to water of at least part of the formation is reduced whilst at the same time any decrease in the overall hydrocarbon permeability of the formation is minimized. This may be achieved, for example, by selectively blocking or impeding fluid flow (e.g. the flow of water) in those zones of the formation through which water predominantly flows whilst at the same time leaving those zones through which hydrocarbon predominantly flows substantially unchanged (i.e. substantially maintaining the flow of hydrocarbon in the formation). For example, if the formation to be treated is a multi-layered formation (e.g. a sandstone formation) with two or more hydrocarbon-rich layers the method of the invention may be used to treat the first drained or depleted layer (i.e. that from which essentially all hydrocarbon has been recovered) before starting production from the next hydrocarbon layer. In this way the method of the invention may be used to effectively isolate or "shut-off" the first layer which, following depletion, would otherwise produce water. The production of hydrocarbon is therefore facilitated without the need for mechanical isolation in the well bore.

Thus, in a preferred aspect of the invention the permeability of water-rich regions of the formation is reduced (e.g. decreased by at least 25%, more preferably by at least 50%, e.g. by at least 80%). By a "water-rich region" is meant an area of the formation comprising greater than 50%, preferably greater than 70%, still more preferably greater than 80%, water and/or aqueous fluids. In a further preferred aspect of the invention the permeability of hydrocarbon-rich regions of the formation is substantially unchanged prior to, and after, treatment according to the methods herein described. For example, the hydrocarbon-permeability is preferably decreased by less than 55%, more preferably less than 30%, e.g. less than 20%. By a "hydrocarbon-rich region" is meant an area of the formation comprising greater than 50% hydrocarbon, preferably greater than 70% hydrocarbon, still more preferably greater than 80% hydrocarbon.

The effect of reducing the permeability of water-rich regions of the formation is to reduce the overall water permeability of the formation. Preferably, the overall water permeability of the formation is reduced by 40-100%, preferably 60-100%, e.g. 80-100%. The overall hydrocarbon permeability of the formation is preferably reduced by 0-50%, more preferably 0-30%, e.g. 0-20%. Still more preferably the hydrocarbon permeability of the formation will be substantially the same both prior to and after treatment in accordance with the methods of the invention.

The reduction in permeability of a subterranean formation to a given fluid may alternatively be expressed in terms of a resistance factor, $R_f$. For example, the quotient of permeability to water at irreducible oil saturation prior to treatment ($K_{wi}$) to the permeability to water at irreducible oil saturation after treatment ($K_{wf}$) is defined herein as the resistance factor for water. Preferably, the method of the invention provides a water resistance factor, $R_f$ of at least 10, more preferably at least 50, e.g. at least 100 as measured at a flow rate of 1 ml/min across a core of diameter 65 mm.

The quotient of permeability to oil at irreducible water saturation before treatment ($K_{oi}$) to permeability to oil at irreducible water saturation after treatment ($K_{of}$) is analogously defined herein as the resistance factor for oil. Preferably, the method of the invention provides an oil resistance factor, $R_f$ of 50 or less, more preferably 10 or less, e.g. 5 or less as measured at a flow rate of 1 ml/min across a core of diameter 65 mm. Still more preferably a formation treated in accordance with the method of the invention may have a post-treatment resistance factor for water of at least 50 and a post-treatment resistance factor for oil of 10 or less as measured at a flow rate of 1 ml/min across a core of diameter 65 mm.

A desired effect of reducing the permeability of at least put of the formation (e.g. water-rich regions of the formation) is to reduce the volume of water obtained during production of hydrocarbon. Preferably, the production of water from the formation is reduced by 5 to 90%, preferably 10 to 95%, more preferably 20 to 99%, e.g. at least 40% after treatment in accordance with the methods herein described. Still more preferably the v/v ratio of hydrocarbon to water produced from a well following treatment according to the invention is at least 70:30, more preferably at least 80:20, e.g. at least 90:10.

In the method of the invention permeability modification (e.g. selective permeability modification) as hereinbefore described is achieved using a water control treatment agent comprising an organosilane. Whilst not wishing to be bound by theory, it is believed that the organosilanes herein described, upon contact with water, form polymers which when present in sufficient amounts form a polymer network which serves to prevent or impede fluid (e.g. water) flow in or through the formation. In contrast, in those parts of the formation mainly containing hydrocarbon (i.e. only low levels of water) little, if any, polymer may be formed and these parts of the formation are essentially unaffected by the treatment. In this way, the permeability of those parts of the formation containing the highest levels of water may be reduced whilst the permeability of those parts containing mainly hydrocarbon (i.e. little water) essentially remain unchanged. Hence any decrease in the overall permeability of the formation to hydrocarbon (e.g. oil) may be minimized. Therefore, unlike conventional prior art methods, the method of the invention does not rely upon the preferential partitioning of a water control agent into water, rather than hydrocarbon. Instead the water control treatment agent herein described may flow throughout the entire formation and selectivity is achieved by the fact that sufficient polymer to block or impede fluid flow is only formed in regions comprising high levels of water. Unlike prior art methods which involve the use of polymer materials such as PVA and polyacrylic acid to block the pores, the polymer that is effective to impede fluid flow in the methods of the invention is only produced on contact with water (i.e. within the formation). In the invention the water control agent is thus essentially free from any polymer material. Accordingly, the method of the invention is more selective than those conventionally used.

Organosilanes for use in the invention are preferably dispersible or soluble in a hydrocarbon (e.g. a $C_{1-20}$ alkane). Still more preferably, the organosilanes for use in the invention are also at least partially water soluble (e.g. water soluble). In some cases the material for use in the invention will be more soluble in hydrocarbon than in water. More preferably, however, the organosilanes for use in the invention will be more soluble in water than in hydrocarbon. The organosilanes for use in the invention may, for example, partition between hydrocarbon and water in a ratio in the range 5:95 to 90:10, more preferably 10:90 to 70:30, for example, about 40:60. The ability to partition in this way enables the organosilanes to be delivered to the formation in a hydrocarbon carrier (i.e. substantially without undergoing reaction) whilst at the same time enabling it to undergo reaction on contact with water at the desired point of action. Preferably, the carrier is substantially free from water.

Organosilanes for use in the invention include, for example, organosilane hydrides, organosilane alkoxides and organosilane amines. Organosilane compounds have the advantage that they are typically oil-soluble and have the necessary reactivity with water. These are also biodegradable and environmentally acceptable (e.g. for DYNASYLAN AMEO: $LC_{50}$ fish=934 mg/l; $EC_{50}$ daphnia=331 mg/l; $IC_{50}$ algae=603 mg/l, biodegradability 67%, for DYNASYLAN bis-AMEO: $LC_{50}$ fish>200 mg/l; $EC_{50}$ daphnia>200 mg/l; $IC_{50}$ algae=125 mg/l, biodegradability 64.5%, as tested according to OECD 306). Organosilanes for use in the invention preferably have a biodegradability of at least 60%.

Whilst not wishing to be bound by theory, it is believed that organosilane compounds undergo hydrolysis upon contact with water. The resulting chemicals then react with each other as well as with siliceous surfaces in the formation (e.g. the surface of silica sand). The result is the formation of a polymer and in some cases a polymer network capable of blocking or impeding the flow of fluid.

Particularly preferred organosilane compounds include those having at least one hydrolysable bond. By a "hydrolysable bond" is meant a bond that is capable of being cleaved on reaction with water. Preferably the hydrolysable bond will be attached to a silicon atom. In other words, the hydrolysable bond is preferably between Si and a second atom/group in the molecule. Still more preferably the hydrolysable bond is one which may hydrolyze to produce a silanol (i.e. —Si—OH).

Although not wishing to be bound by theory, it is believed that the hydrolysis of an organosilane may be critical to the success of the method herein described. More specifically it is thought that the organosilane, upon contact with water in the formation, hydrolyses to form a silanol:

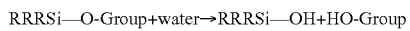

RRRSi—O-Group+water→RRRSi—OH+HO-Group

Figure 1B:
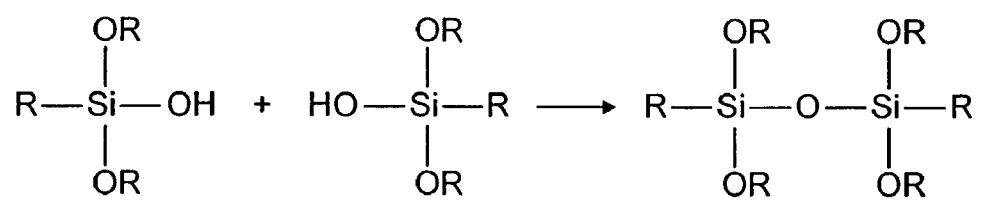
FIG. 1b illustrates the reaction between two silanol molecules to form a dimer.
Figure 1C:
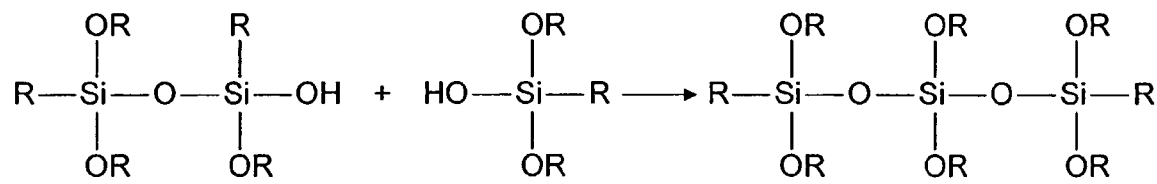
FIG. 1c illustrates the reaction of a dimer with further silanols and/or the molecules of a hydrocarbon formation.
Figure 1C:
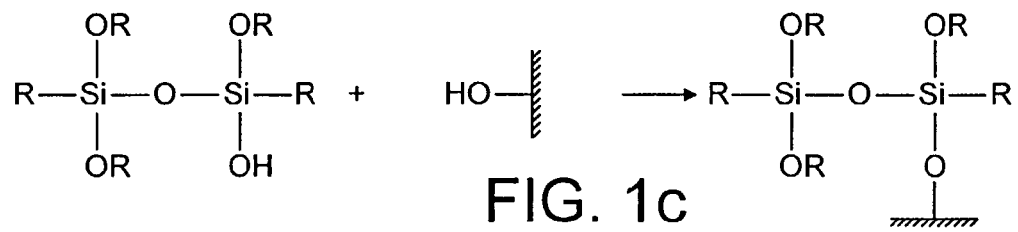
Figure 1D:
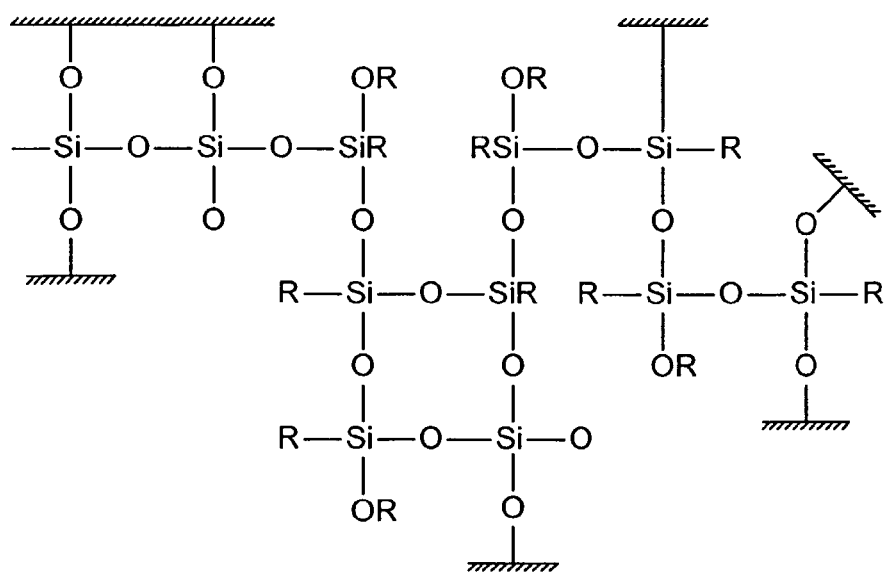
FIG. 1d illustrates the formation of a polymer that substantially fills the space between particles comprising a hydrocarbon formation.

This silanol is then believed to react with other silanol molecules by forming —Si—O—Si— bonds and/or active sites (e.g. SiOH bonds) on the surface of the formation (e.g. sand particles). In fact the various reactions which the silanol molecules undergo serve to form a polymer that may act to impede or eliminate the movement of water through the formation (see FIG. 1). Whilst reaction of a silanol molecule with the surface of the formation serves to covalently bond the organosilane to particles comprising the formation (see FIG. 1*a*), the reaction between two silanols enables them to covalently bond to each other to form a dimer (see FIG. 1*b*). Subsequent reaction of the dimer with further silanols and/or the molecules of the formation facilitates the production of a polymer (see FIG. 1*c*) and eventually formation of a polymer that substantially fills the space (e.g. pores) between the particles comprising the formation (see FIG. 1*d*). In this way, the permeability of those parts of the formation comprising mainly water is substantially reduced. Advantageously the method of the present invention also affords a polymer that is extremely stable (e.g. it can withstand a wide range of pH, temperature and pressure). For instance, unlike the polyacrylamide polymers used in some prior art methods, the method of the present invention affords a polymer that can withstand temperatures up to 200° C. Hence following treatment by the method of the present invention other conventional treatments and/or strategies to facilitate hydrocarbon recovery may be employed (e.g. use of higher pressure in the form of a higher draw down).

The amount by which the permeability of the formation is reduced may depend on the extent of polymerization and therefore on the number of bonds the organosilane forms with the particles of the formation and/or the extent to which reaction occurs between different organosilane compounds. This, in turn, at least partially depends on how many silanol groups can be formed per molecule.

Preferred organosilane compounds for use in the invention comprise 1 to 12 hydrolysable bonds, more preferably 3 to 9 hydrolysable bonds, still more preferably about 6 hydrolysable bonds. Such compounds possessing hydrolysable bonds may well be able to self-condense and/or polymerize after hydrolysis of one or more of the hydrolysable bonds. The afore-mentioned preferred numbers of hydrolysable bonds therefore relates to the number present in the monomeric form of the compound (i.e. one which has not undergone oligomerisation or polymerization). For example, aminotriethoxysilane contains 3 hydrolysable bonds (i.e. 3× Si—OEt) and bis-(triethoxysilylpropyl)amine contains 6 hydrolysable bonds (i.e. 6× Si—OEt). In the organosilane compounds for use in the invention, the hydrolysable bonds present may be different, but more preferably are the same.

In preferred organosilane compounds for use in the invention at least one hydrolysable bond comprises part of a terminal group. More preferably, all of the hydrolysable bonds comprise part of a terminal group. By a "terminal group" is meant a group that is located at one end of the molecule. This is in contrast to a side group or pendant group that is attached to another part of the molecule. For example, in the compound aminotriethoxysilane, the amino group and the —Si(OEt)$_3$ groups are terminal groups. In contrast in the compound bis-(triethoxysilylpropyl)-amine the —Si(OEt)$_3$ groups are terminal groups, whereas the amine group is not.

In particularly preferred compounds for use in the invention all bonds other than the afore-mentioned hydrolysable bonds, are stable to the conditions to which it is exposed in use (e.g. stable to hydrolysis in sea water). Preferably the remaining bonds in the molecule are carbon-carbon, carbon-hydrogen, silicon-carbon, nitrogen-carbon, oxygen-carbon and/or nitrogen-hydrogen bonds.

Preferred organosilane compounds may also include an amine group. Whilst not wishing to be bound by theory, the presence of the amine function is thought to result in better adsorption of the organosilane to the formation. The presence of an amine group may therefore result in stronger adhesion of the organosilane to the particulates of the formation and/or increase the stability of the organosilane to high temperatures and/or pressures. This may be due to the fact that the amine group may form further bonds (e.g. covalent, hydrogen and/or ionic bonds) between the organosilane and the formation and/or other organosilanes. Preferably the amine is a primary amine (i.e. —NH$_2$), still more preferably a secondary amine (i.e. —NH—).

Particularly preferred are those organosilane compounds which include more than one functional group, e.g. bifunctional organosilanes, or those compounds which are capable of self-polymerization to produce bifunctional molecules. By "bifunctional organosilane" is meant an organosilane comprising two separate Si atoms, each of which forms part of at least one hydrolysable bond. Bifunctional organosilanes therefore advantageously afford, upon contact with water, at least two separate —Si—OH groups, which may each undergo any of the above-described reactions (e.g. with another silanol). Bifunctional organosilanes therefore increase the extent of polymerization and therefore the size of the polymers produced. Bifunctional organosilanes containing an amine group are particularly preferred.

Monofunctional organosilanes are also useful in the method of the invention. By monofunctional organosilane is meant an organosilane comprising one Si atom that forms part of at least one hydrolysable bond. In contrast to bifunctional organosilanes, monofunctional organosilanes tend to allow for less bonding to occur between different organosilanes, particularly those bound to different particles in the formation. Monofunctional organosilanes containing an amine group are particularly preferred.

It is particularly preferred in the method of the invention to use a mixture of a bifunctional and a monofunctional organosilane. For instance, the mixture may comprise a bifunctional to monofunctional organosilane ratio of 75:25 to 25:75, more preferably 60:40 to 40:60, still more preferably about 50:50. These ratios of bifunctional to monofunctional organosilanes have, in many cases, been found to yield the desired balance of providing sufficient polymer network formation to significantly reduce the permeability of the formation in areas of high water concentration without drastically reducing the formation's permeability in oil predominant areas. This, in turn, enables hydrocarbon (e.g. oil) to be extracted from treated wells more economically.

Representative examples of organosilanes that are suitable for use in the invention are organosilane alkoxides, organosilane esters, organosilane oximes, organosilane halides and organosilane hydrides. These compounds contain at least one —Si—OR, —SiO(O)CR, —SiO—N=CRR', —SiX and —SiH group respectively (wherein R and R' may be C$_{1-20}$ alkyl and X is a halogen). Hydrolysis of compounds containing these groups yields, in addition to a silanol (i.e. —Si—OH), —ROH, —RC(O)OH, —R'RC=NOH, —HX and —H$_2$ respectively wherein R, R' and X are as hereinbefore defined.

Particularly preferred organosilane compounds are organosilane alkoxides and organosilane esters. These undergo hydrolysis to afford, in addition to a silanol, alkanols and weak acids respectively. Neither of these compounds generally causes problems (e.g. due to side reactions) in hydrocarbon wells. Preferred organosilane compounds for use in the invention comprise a group of the formula —Si—OR wherein R is $C_{1-20}$ alkyl, more preferably $C_{2-6}$ alkyl, e.g. ethyl. Other preferred organosilane compounds comprise a group of the formula Si—O(O)CR wherein R is $C_{1-20}$ alkyl, more preferably $C_{2-6}$ alkyl, e.g. methyl.

Organosilanes suitable for use in the invention include those compounds of formula I:

$$R^1R^2R^3Si\text{—}R^4 \quad (I)$$

(wherein $R^1$, $R^2$ and $R^3$ are each independently selected from hydrogen and organic radicals having from 1 to 50 carbon atoms; and $R^4$ is hydrogen, an organic radical having from 1 to 50 carbon atoms, or a group —$OR^5$ in which $R^5$ is an organic radical having from 1 to 50 carbon atoms;

with the proviso that at least one of $R^1$, $R^2$, $R^3$ and $R^4$ is other than hydrogen).

In the compounds of formula I, $R^1$-$R^5$ are preferably selected from optionally substituted alkyl, alkenyl, aryl and alkoxy groups having from 1 to 18, preferably from 1 to 10, e.g. 1 to 6, carbon atoms. Optional substituents which may be present include alkoxy (e.g. $C_{1-6}$ alkoxy), amino, silyl and silyloxy groups. The groups $R^1$-$R^5$ may further be interrupted by one or more heteroatoms, preferably by N, O or S, e.g. by a group —$NR^{12}$ where $R^{12}$ is H or $C_{1-6}$ alkyl.

Preferred compounds for use in the invention are those represented by formula (II):

$$R^{10}{}_b(RO)_{3-b}Si\text{—}R^{11} \quad (II)$$

(wherein b is zero or a positive integer from 1 to 3, preferably 0 or 1, e.g. 0;

$R^{10}$ is a substituted or unsubstituted, preferably unsubstituted, alkyl group having from 1 to 6 carbon atoms, e.g. $C_1$ alkyl;

each R is independently a substituted or unsubstituted, preferably unsubstituted, alkyl group having from 1 to 18 carbon atoms, e.g. 1 to 6 carbons, or a —$COR^{13}$ group wherein $R^{13}$ is an optionally substituted, preferably unsubstituted, $C_{1-18}$ alkyl, e.g. $C_{1-6}$ alkyl group; and $R^{11}$ is a substituted or unsubstituted alkyl group having from 1 to 40 carbon atoms (preferably 1 to 18 carbon atoms, e.g. 1 to 8 carbons) and which is optionally interrupted by one or more heteroatoms; or $R^{11}$ is a group of the formula —$(CH_2)_x$-A-$(CH_2)_y$—Si$(OR)_3$ in which A is an organic linking group or a group comprising an atom having a lone pair of electrons (e.g. a N, P or S atom); x is 0 or a positive integer, preferably from 1 to 10, more preferably 1 to 4, e.g. 2 or 3; y is 0 or a positive integer, preferably from 1 to 10, more preferably 1 to 4, e.g. 2 or 3; and R is as hereinbefore defined).

In preferred compounds of formula II, R is a $C_{1-6}$ alkyl group, more preferably a $C_{2-4}$ alkyl group, for example, methyl or ethyl. In particularly preferred compounds of formula II, each R is the same.

Preferred compounds of formula II are also those wherein $R^{11}$ is an unsubstituted alkyl group (e.g. $R^{11}$ may be propyl, butyl, pentyl, hexyl, heptyl, octyl, nonyl, decyl or dodecyl, especially preferably octyl).

In particularly preferred compounds of formula II, $R^{11}$ is a substituted or unsubstituted, preferably substituted, alkyl group (e.g. a substituted $C_{1-12}$ alkyl group). Preferred alkyl groups include propyl and butyl. Substituents which may be present include —$NH_2$, —NHR' and —NR'R'' wherein R' and R'' independently represent $C_{1-6}$ alkyl groups.

Particularly preferred organosilanes for use in the invention are those represented by formula III:

$$(RO)_3Si\text{—}(CH_2)_x\text{-A-}(CH_2)_y\text{—}Si(OR)_3 \quad (III)$$

(wherein each R is independently a substituted or unsubstituted, preferably unsubstituted, alkyl group having from 1 to 18 carbon atoms, e.g. 1 to 6 carbons, or a —$COR^{13}$ group wherein $R^{13}$ is an optionally substituted, preferably unsubstituted, $C_{1-18}$ alkyl, e.g. $C_{1-6}$alkyl group;

A is an organic linking group or a group comprising an atom having a lone pair of electrons (e.g. a N, P or S atom);

x is 0 or a positive integer, preferably from 1 to 10, more preferably 1 to 4, e.g. 2 or 3; and y is 0 or a positive integer, preferably from 1 to 10, more preferably 1 to 4, e.g. 2 or 3).

In formulae II and III, the function of group A is as a linking moiety and its precise chemical nature is of lesser importance provided this function is fulfilled. Generally, however, it will comprise a chain 1 to 20 atoms long, preferably 1 to 10, especially 1 to 5. Examples of suitable linkers include both linear and branched alkylene chains which may be interrupted by heteroatoms such as nitrogen and oxygen.

In formulae II and III, x and y will generally be identical.

In preferred compounds of formula III, R is a $C_{1-6}$ alkyl group, more preferably a $C_{2-4}$ alkyl group, for example, methyl or ethyl. In particularly preferred compounds each R is the same.

Preferred compounds of formulae II and III are also those wherein A is a group comprising an atom having a lone pair of electrons, especially nitrogen. Preferably A will be a group —NH or —NR where $R^6$ is $C_{1-6}$ alkyl.

Other preferred organosilanes for use in the invention are those represented by formula IV:

$$R^9{}_a(RO)_{3-a}Si\text{—}(CH_2)_z\text{—}NR^7R^8 \quad (IV)$$

(wherein $R^7$ and $R^8$ are independently hydrogen or a substituted or unsubstituted, preferably unsubstituted, alkyl group having from 1 to 6 carbon atoms;

z is a positive integer, preferably from 1 to 20, more preferably 1 to 8, e.g. 3 or 8;

a is zero or a positive integer from 1 to 3, preferably 0 or 1 (e.g. 0);

$R^9$ is a substituted or unsubstituted, preferably unsubstituted, alkyl group having from 1 to 6 carbon atoms (e.g. $C_1$); and R is as hereinbefore defined in relation to formula III).

In preferred compounds of formula IV, at least one of $R^7$ and $R^8$ is hydrogen. More preferably both $R^7$ and $R^8$ are hydrogen. Further preferred compounds of formula IV are those wherein z is at least 2, still more preferably z is at least 3 (e.g. z is 3).

Unless otherwise specified, any alkyl or alkenyl group referred to herein may be mono- or poly-substituted and may be branched or unbranched.

It is particularly preferred in the method of the invention to use a mixture of a compound of formula III and a compound of formula IV. For instance, the mixture may comprise a compound of formula III to a compound of formula IV in a ratio of 75:25 to 25:75, more preferably 60:40 to 40:60, still more preferably about 50:50.

Suitable organosilanes include 3-amino-propyltriethoxysilane, bis(triethoxysilylpropyl)amine, 3-(diethoxymethylsilyl)propylamine, trimethoxyoctylsilane, triethoxyoctylsilane, 4,4,15,15-tetraethoxy-3,16-dioxa-8,9,10,11-tetrathia-4,15-disilaoctadecane, and any combination thereof. Such compounds are available commercially, e.g. from Degussa (Hanau, Germany) under the tradenames DYNASYLAN 1126, DYNASYLAN 1122, DYNASYLAN 1506, DYNASYLAN OCTMO, DYNASYLAN OCTEO, DYNASYLAN AMEO and Si 69. A preferred combination of organosilanes for use in the invention is that comprising 3-aminopropyltriethoxysilane and bis(triethoxy silylpropyl)amine, preferably in a ratio of 75:25 to 25:75, more preferably 60:40 to 40:60, still more preferably about 50:50. A particularly preferred mixture is that sold under the tradename DYNASYLAN 1126.

The amount of organosilane to be used will vary widely depending on factors such as the nature of the particular organosilane used, the nature (e.g. permeability, temperature, etc.) of the rock formation, the volume of water naturally present and so on. In general, the amount of organosilane used will be sufficient to reduce the permeability of at least part of the formation (e.g. water-rich regions) such that hydrocarbon can be produced economically and appropriate amounts may readily be determined by those skilled in the art.

The organosilanes for use in the method of the invention are preferably applied as a dispersion or solution in a liquid carrier. Thus the water control treatment agent preferably comprises a liquid carrier. The liquid carrier may be aqueous or non-aqueous. Preferably, this will comprise a non-aqueous organic liquid, e.g. a hydrocarbon or hydrocarbon mixture, typically a $C_3$ to $C_{15}$ hydrocarbon, or oil, e.g. base oil, crude oil or lamp oil. Other suitable carrier liquids include aromatic hydrocarbons such as naphtha and diesel. Diesel is particularly preferred.

In the water control treatment agent of the invention it is generally preferred to use a hydrocarbon carrier since these this will minimize the exposure of the organosilane to water. This means that reaction (e.g. hydrolysis) during passage down into the well to the formation to be treated is minimized or prevented. Preferably the hydrocarbon carrier is substantially anhydrous. For example the hydrocarbon carrier preferably contains less than 5% water, more preferably less than 2% water, still more preferably less than 0.5% water, e.g. less than 0.1% water.

Thus, viewed from a further aspect the invention provides a water control treatment agent comprising (e.g. consisting essentially of) an organosilane as hereinbefore defined and optionally a substantially anhydrous hydrocarbon carrier, wherein said organosilane is present in an amount effective to control water in a subterranean formation, e.g. to reduce the water permeability of at least part of said formation, preferably whilst minimizing any decrease in the overall hydrocarbon (e.g. oil) permeability of the formation.

Preferably, the water control treatment agent for use in the invention will be substantially free from other polymer materials such as the hydrophilic polymer materials proposed in the prior art. For example, this will be substantially free from a relative permeability modifier macromolecule such as a homo or copolymer of acrylamide, polyvinylalcohol, polysiloxane, a natural gum or chemically modified derivative thereof. The water control treatment agent may, for example, be substantially free from polymer material other than that formed by polymerization of the organosilane therein. For example, the amount of any other polymer material will typically be less than 10 wt. %, preferably less than 0.5 wt. %, more preferably less than 0.1 wt. %, e.g. less than 0.01 wt. %. Preferably any polymer material present in the water control treatment agent will have a weight average molecular weight of less than 50,000 g/mole.

Suitable hydrocarbon carrier liquids include crude oil, base oil, lamp oil, an aliphatic hydrocarbon (e.g. hexane), an aromatic hydrocarbon (e.g. benzene or toluene) or a petroleum distillation product or fraction (e.g. kerosene, naphthas or diesel fuel). Preferably the hydrocarbon comprises a petroleum distillation product, especially diesel fuel.

The liquid carrier (e.g. hydrocarbon carrier) may also contain other additives known in the art for use in well treatment. Such additives may include surfactants, thickeners, diversion agents, pH buffers and catalysts. Preferably the carrier does not contain a catalyst and/or a polymer, especially a polymer. It will be appreciated that the organosilanes for use in the invention are capable of forming polymers upon contact with water in the formation. Thus the preferred absence of a polymer refers to the water control treatment agent prior to its contact with water. Still more preferably the water control treatment agent comprises less than 500 ppm polymer, more preferably less than 100 ppm polymer. Particularly preferably the water control treatment agent consists essentially of (e.g. consists of) an organosilane and a liquid (e.g. hydrocarbon) carrier.

Preferably, the concentration of the organosilane in the liquid carrier will be in the range of 0.05-50% w/v, preferably 10 to 30% w/v, more preferably 20 to 25% w/v, e.g. about 25% w/v. A higher concentration will generally be used for deeper perforations. Typically about 50 to 1000 liters (e.g. 100 to 400 liters) of hydrocarbon carrier per $m^3$ of formation to be treated will be used.

It is envisaged that treatment with an organosilane in accordance with the method herein described could be at any stage in hydrocarbon production, i.e. before and/or after hydrocarbon production (i.e. extraction of oil or gas from the well) has begun. In some cases, the treatment will be prior to hydrocarbon production in order to facilitate maximum extraction of hydrocarbon. More preferably, treatment is carried out once a water problem (e.g. coning or channeling) is identified or potential for a water problem is identified. It may often be beneficial to carry out treatment in accordance with the invention before water production becomes severe. Nevertheless the treatment method herein described may be repeated as necessary in order to minimize or prevent water production. Thus, a well may be treated prior to production and then again after a potential water problem is identified.

Other conventional well treatments such as stimulation treatment, hydraulic fracture treatment and scale reduction treatment may also be used in conjunction with the method of the invention. These may precede or follow the method of the invention. Preferably, however, the well is ready to be put back onto production immediately after treatment in accordance with the method of the invention.

Treatment is conducted by contacting the formation with a water control treatment agent, generally through a well bore, and typically employing pressures sufficient to penetrate the formation. By "contacting" is meant pumping, injecting, pouring, releasing, circulating or otherwise placing the water control treatment agent within a well, well bore and/or formation. Any method known in the art may be used. Treatment times or period of shut-in will depend on a number of factors including the nature of the formation and the volume of water present, the nature and concentration of the organosilane employed, the depth of perforations, etc. Typical shut-in times may be determined by those skilled in the art and will generally range from 2 to 10 hours, preferably from 3 to 8 hours, e.g. about 4 to 6 hours.

Any conventional treatment methods may be used to supply the water control treatment agent to the well. Such methods will include bull-heading and coil tubing. Preferably zonal isolation (e.g. with packers) is not required. Of these methods, bull-heading will generally be preferred. This is in contrast to many prior art methods where treatment chemicals are generally placed at various points in the formation, e.g. placed by coiled tubing to spot this at the desired site. This is a more costly operation to perform. An advantage of bull-heading is that the whole well is treated and at relatively low cost. Bull-heading can be used for treatment of both vertical and horizontal wells and treatment can be effected during short production intervals. Suitable injection flow rates may be readily determined by those skilled in the art, however preferred flow rates may lie in the range 2500 to 3000 liters/min. In general, the injection flow rate will not be lower than about 500 liters/min.

Coiled tubing (CT) methods are less desirable for economic reasons but may nevertheless be successfully used to supply the materials to the well. Such methods are generally more appropriate for treating long horizontal sections of the well. Suitable CT methods include those conventionally used in the field, e.g. roto pulse method, concentric coiled tubing, etc.

In a preferred method of the invention the water treatment agent is shut-in following its entry into the formation. The shut-in period is a function of the conditions in the well (e.g. temperature, pressure etc) which affect the rate at which polymerization of the organosilane occurs. Typically, however, the shut-in period will be from 3 to 24 hours, preferably 4 to 12 hours, for example, 6 to 9 hours. Following shut in, the well is preferably put back onto production. Preferably the ratio of water to hydrocarbon then produced is lower than that prior to the treatment. For example, the v/v ratio of hydrocarbon to water is preferably at least 20:80, more preferably at least 30:70 (e.g. 10:90 to 95:5) since at these ratios hydrocarbon can generally be produced economically.

Thus, viewed from a further aspect the invention provides a method of treating a water and hydrocarbon producing subterranean formation whereby to reduce (preferably by 5 to 90%, more preferably by 10 to 95%, e.g. by at least 40%) the amount of water produced therefrom during hydrocarbon recovery, said method comprising:
(a) providing a water control treatment agent comprising (e.g. consisting essentially of) an organosilane as hereinbefore described; and
(b) contacting said formation with an amount of said agent effective to reduce the amount of water produced therefrom during hydrocarbon recovery.

The process of the invention is particularly effective in increasing tail-end production in more mature wells where the ratio of water to hydrocarbon produced is high (e.g. 80:20 v/v or more). Hitherto, such wells would tend to be shut down once the production rate of water reaches a level at which the cost of handling the water outweighs the value of the hydrocarbon (e.g. oil) recovered. However, by treating these wells in accordance with the method herein described the production of water may be reduced to the extent that economic production from the well may be continued. In this way the lifetime of the well can be prolonged and the huge costs involves in establishing a new formation are avoided or at least delayed.

It is also envisaged that the method of the present invention may be used to treat (e.g. "shut-off") a water-rich subterranean formation, e.g. a subterranean formation from which hydrocarbon production has been completed. Very little, if any, hydrocarbon may remain in such a formation, therefore high levels of water are usually present. As a result when treatment in accordance with the method of the invention is carried out, the entire formation contacted with the agent tends to become blocked or plugged. In this way, both the water and hydrocarbon permeability of the formation may be reduced and the movement of fluid (e.g. water) into other parts of the formation or connected formations may be prevented.

Thus viewed from a still further aspect the invention provides a method of sealing or plugging a water-rich (e.g. oil depleted) subterranean formation, said method comprising contacting said formation with a water control treatment agent which comprises (e.g. consists essentially of) an organosilane as hereinbefore defined in an amount effective to reduce the permeability of said formation.

Also suitable for use in a method of sealing or plugging a water-rich (e.g. oil depleted) subterranean formation are enzyme systems. These comprise an enzyme and a substrate for the enzyme whereby the action of the enzyme on the substrate results in precipitation or deposition of a material which effectively impedes the flow of fluid through the formation. The material which is precipitated or deposited in the formation may be produced from a compound present in the rock formation prior to the introduction of the enzyme system. Alternatively, a suitable compound may be introduced into the well in addition to the enzyme and the substrate.

Enzymes suitable for use in the invention include those which remain active under the conditions (temperature, pressure, etc.) found in the subterranean formation to be treated. Typically, these will be water soluble. Preferably, the enzyme is a urease (EC 3.5.1.5). This may be isolated from any plant, animal, bacterial or fungal source. Optionally, this may be chemically modified provided it retains its desired catalytic activity. Examples of suitable ureases include thermophilic or thermostable ureases, e.g. those isolated from Jack bean. Ureases suitable for use in the invention are commercially available from Sigma. A particularly preferred urease is Urease Canavalia ensiformis (Jack bean) available from Sigma under the Product No. U1500.

Suitable enzyme-substrate combinations are ureases in combination with urea. Typically, these will be used together with an aqueous solution which on contact with the enzyme-substrate system is capable of forming a precipitate which plugs or seals the pore system of a formation. A suitable solution for use with urease/urea is an aqueous solution containing a salt of Ca, e.g. calcium chloride. The action of urease on urea generates ammonia and $CO_2$. The $CO_2$ becomes trapped as bubbles of $CO_2$ which on contact with $CaCl_2$ generate $CaCO_3$. Although not wishing to be bound by theory it is believed the calcium carbonate is effective in impeding fluid flow through the formation.

Thus viewed from a still further aspect the invention provides a method of sealing or plugging a water-rich (e.g. oil depleted) subterranean formation, said method comprising contacting said formation with a water control treatment agent which comprises an enzyme and a substrate therefor in an amount effective to reduce the permeability of said formation.

The amount of enzyme/enzyme substrate to be used will vary depending on factors such as the nature (e.g. permeability, temperature, etc.) of the rock formation and so on. In general, the amount of enzyme/enzyme substrate used will be sufficient to substantially seal or plug the formation following treatment and appropriate amounts may readily be determined by those skilled in the art. Typically, the enzyme system may be employed in an amount of from 5 to 300 I.U./cm$^3$, preferably less than 100 I.U./cm$^3$, e.g. less than 50 I.U./cm$^3$.

In a preferred embodiment of this aspect of the invention, the water permeability of the formation is decreased by at least 80%, more preferably by at least 90%, still more preferably by at least 99%. In a further preferred aspect, the hydrocarbon permeability is also decreased (e.g. by at least 80%, more preferably by at least 90%, still more preferably by at least 99%). Still more preferably, this aspect of the invention affords an essentially impermeable formation Typically the formation to be treated will be "water-rich" as a result of prior extraction of hydrocarbon. If necessary, however, additional water may be introduced (e.g. injected) into the formation prior to addition of the water control treatment agent to maximize polymerization and ensure synthesis of an extended polymer network. As mentioned above, the polymer formed by the treatment agent is extremely stable (e.g. it can withstand a wide range of pH, temperature and pressure), hence following treatment in accordance with the method of the invention the formation may remain plugged or sealed for many years without need for follow up treatments.

Application of the methods of the invention is particularly suited to formations comprising a multi-layered structure (e.g. a sandstone structure) with two or more layers that are saturated with hydrocarbon, more particularly to such structures in which there is no cross flow between the layers. However, any formation structure having watered out conditions may be treated in accordance with the method of the invention. Treatment in accordance with the method of the invention may be especially useful in formations wherein the formation permeability is about 10 mDarcy to 15 Darcy, preferably 0.5 to 5 Darcy.

The invention will now be described further with reference to the following non-limiting Examples:

EXAMPLE 1

Figure 2:
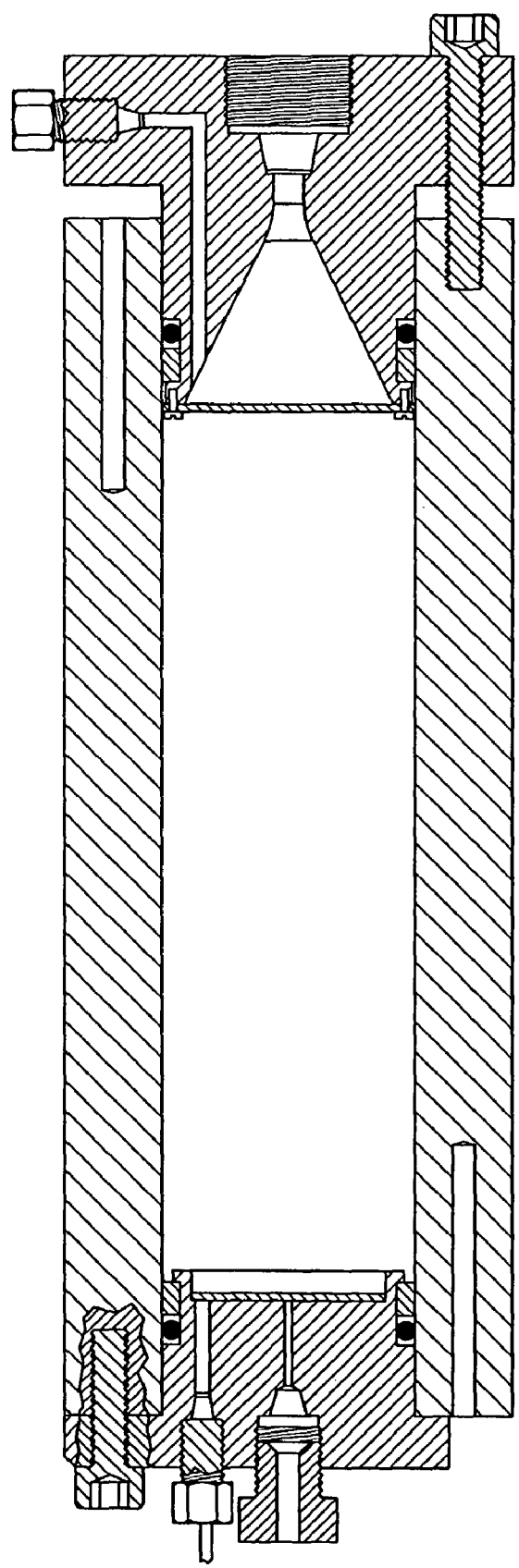
FIG. 2 illustrates a cylindrical sand pack holder.

The ability of 25% vol DYNASYLAN 1126 (Degussa AG, Germany) to reduce the permeability of Heidrun sand was tested using a cylindrical sand pack holder as illustrated in FIG. 2 and having the following dimensions: 209 mm (length)×65 mm (diameter) and a total sand volume of 157 cm². The sand pack holder was connected with differential pressure transducers and placed inside a heating cabinet. A pulse-free pump was used to generate a flow velocity of 1 or 2 ml/min.

Experimental Procedure:
1. The sand (Heidrun sand) was packed in the sleeve and the sand pack vertically oriented.
2. The line and sleeve pressures were 15 and 55 bar respectively.
3. 10 pore volumes (PV) of formation water (FW) were injected (1 ml/min). from the bottom of the vertical sand pack.
4. $K_w$ was measured.
5. $S_{wi}$ was established by injection of lamp oil from the top of the sand pack.
6. $K_o$ was measured.
7. $S_{orw}$ was established by injection of FW from the bottom of the sand pack.
8. $K_w$ at $S_{orw}$ was measured.
9. 3 PV of 25 vol % DS1126 in lamp oil was injected (2 ml/min) into the sand pack.
10. The heating cabinet was heated to 85° C.
11. The core was shut-in for 3 hours after the core reached 85° C.
12. Lamp oil was injected.
13. $K_o$ was measured.

Results:
Pre-Treatment:
$K_o$=2.54 Darcy (as measured at step 6)
$K_w$=3.47 Darcy (as measured at step 8)
Post-Treatment:
$K_o$<1 m Darcy (the differential pressure was higher than the measuring limit of the pressure transducer therefore it can be concluded that $K_o$ is less than 1 mDarcy). This corresponds to a reduction in permeability to oil of more than 99.96%. $K_w$ could not be measured as the flow of water was completely blocked. The reduction in permeability to water is therefore 100%.

Discussion:
The results show that DYNASYLAN 1126 is capable of reducing the water permeability of a water-saturated sand formation (i.e. that DYNASYLAN 1126 can be used to seal or plug a water-rich (oil depleted) sand formation).

In this experiment, oil permeability was also significantly reduced. However a selective reduction in water permeability occurs in those formations comprising a mixture of hydrocarbon and water prior to treatment.

EXAMPLE 2

In order to demonstrate the ability of the organosilane compounds of the invention to selectively reduce the water permeability of a sand formation, a core-flooding experiment was carried out with two cores in parallel: one Berea (at So@Swi) and one Bentheimer (at 100% @Sw). Treatment solutions comprising 15 vol % DS 1126 in diesel was pumped simultaneously into both cores and the cores took up the the treatment solution ad libertum, e.g due to the permeability differences and possible saturation/entrance effects.

Experimental Procedure:
15 vol % DYNASYLAN 1126 (DS 1126) in diesel was simultaneously injected into a Berea and a Bentheimer core coupled in parallel and oriented horizontally. Swi was established by injection of kerosene (Statoil L-parafin) followed by injection of a viscous oil (Medicway No. 15).

Conditions of the cores before injection of 15 vol % DS1126:
Berea was at Swi=25.7%
Bentheimer was at Sw=100%
1. Injection (1.5 ml/min) of treatment solution until the effluent weight from Berea was 2.1 grams. DV=0.82 ml; Core: 1.78 ml/cm in HC phase. i.e. 0.93 cm into the core
2. Effluent weight from Bentheimer was 16.6 g DV=0.82 ml; Core: 2.4 ml/cm, i.e. 6.38 cm into the core
3. Diesel was injected until the effluent weight from Berea was 2.1 g, i.e. 1.39 cm into the core.
4. Effluent weight from Bentheimer was 11.5 g, i.e. 4.64 cm into the core
5. The heating cabinet was turned on (80° C.)
6. The shut-in time was 3 hours one the core had reached 50° C.
7. 1.5 PV of Diesel was injected into the Berea core in the reverse flow direction
8. Ko@Swi was measured at 80° C.
9. 1.5 PV of Heidrun Formation water was injected into the Bentheimer core in the reverse flow direction
10. Kw@"So" was measured at 80° C.
11. The heating cabinet was turned off
12. Steps 8 and 10 were repeated at ambient temperature Results:

| Core | Kabs @ Sw = 100% (mD) | Ko @ Sw = 25.7% (mD) | Kabs @ Sw = 100% Post-treatment (mD) | Ko @ Sw = 25.7% Post-treatment (mD) | Permeability Reduction (%) |
|---|---|---|---|---|---|
| Berea | 399 | 92 | | 15 | 83.7 |
| Bentheimer | 2850 | | 51 | | 98.2 |

RRFw = Kwi/Kwf = 2850 mD/51 mD = 55.9
RRFo = Koi/Kof = 92 mD/15 mD = 6.1, Hence RRFw/RRFo = 55.9/6.1 = 9.2

These results show an excellent water shut-off with a RRFw of 55.9. The ratio RRFw/RRFo=9.2 also indicates a good selective treatment of the different zones (a factor of about 10 may be considered as selective placement).

The invention claimed is:

1. A method of controlling water in a subterranean formation, said method comprising selecting a formation comprising a water-rich region, and then contacting said formation with a water control treatment agent which comprises a substantially anhydrous hydrocarbon carrier and an organosilane in an amount effective to reduce the water permeability of at least part of said formation, such that water permeability in at least part of said formation is reduced.

2. A method as claimed in claim 1, wherein the concentration of said organosilane in said carrier is 10 to 50% w/v.

3. A method as claimed in claim 1, wherein any decrease in the overall hydrocarbon permeability of said formation is minimized.

4. A method as claimed in claim 1, wherein the permeability of water-rich regions of said formation is reduced.

5. A method as claimed in claim 1, wherein the water permeability of said formation is reduced by 40-100%.

6. A method as claimed in claim 1, wherein the hydrocarbon permeability of said formation is reduced by 0-50%.

7. A method as claimed in claim 1, wherein the production of water from said formation is reduced by at least 10%.

8. A method as claimed in claim 1, wherein the organosilane is an organosilane hydride, an organosilane alkoxide or an organosilane amine.

9. A method as claimed in claim 1, wherein said organosilane comprises an amine group.

10. A method as claimed in claim 1, wherein said organosilane is bifunctional.

11. A method as claimed in claim 1, wherein the organosilane comprises a compound of formula I:

$$R^1R^2R^3Si-R^4 \qquad (I),$$

wherein
R$^1$, R$^2$ and R$^3$ are each independently selected from hydrogen and organic radicals having from 1 to 50 carbon atoms; and
R$^4$ is hydrogen, an organic radical having from 1 to 50 carbon atoms, or a group —OR$^5$ in which R$^5$ is an organic radical having from 1 to 50 carbon atoms;
with the proviso that at least one of R$^1$, R$^2$, R$^3$ and R$^4$ is other than hydrogen.

12. A method as claimed in claim 11, wherein in formula I, R$^4$ is —OR$^5$ where R$^5$ is C$_{1-8}$ alkyl.

13. A method as claimed in claim 1, wherein the organosilane comprises a compound of formula II:

$$R^{10}{}_b(RO)_{3-b}Si-R^{11} \qquad (II),$$

wherein
b is zero or a positive integer from 1 to 3;
R$^{10}$ is a substituted or unsubstituted, preferably unsubstituted, alkyl group having from 1 to 6 carbon atoms;
each R is independently a substituted or unsubstituted alkyl group having from 1 to 18 carbon atoms or a —COR$^{13}$ group wherein R$^{13}$ is an optionally substituted C$_{1-18}$ alkyl; and
R$^{11}$ is a substituted or unsubstituted alkyl group having from 1 to 40 carbon atoms and which is optionally interrupted by one or more heteroatoms; or
R$^{11}$ is a group of the formula —(CH$_2$)$_x$-A-(CH$_2$)$_y$—Si(OR)$_3$ in which A is an organic linking group or a group comprising an atom having a lone pair of electrons; x is 0 or a positive integer; y is 0 or a positive integer.

14. A method as claimed in claim 1, wherein the organosilane comprises a compound of formula III:

$$(RO)_3Si-(CH_2)_x\text{-}A\text{-}(CH_2)_y-Si(OR)_3 \qquad (III),$$

wherein
each R is independently a substituted or unsubstituted alkyl group having from 1 to 18 carbon atoms or a —COR group;
A is an organic linking group or a group comprising an atom having a lone pair of electrons;
x is 0 or a positive integer; and
y is 0 or a positive integer.

15. A method as claimed in claim 1, wherein the organosilane comprises a compound of formula IV:

$$R^9{}_a(RO)_{3-a}Si-(CH_2)_z-NR^7R^8 \qquad (IV),$$

wherein R$^7$ and R$^8$ are independently hydrogen or a substituted or unsubstituted alkyl group having from 1 to 6 carbon atoms;
z is a positive integer;
a is zero or a positive integer from 1 to 3;
R$^9$ is a substituted or unsubstituted alkyl group having from 1 to 6 carbon atoms; and
R is a substituted or unsubstituted alkyl group having from 1 to 18 carbon atoms.

16. A method as claimed in claim 1 wherein said organosilane comprises a mixture of a compound of formula III and a compound of formula IV.

17. A method as claimed in claim 1, wherein the organosilane comprises 3-aminopropyltriethoxysilane, bis(triethoxysilylpropyl)amine, 3-(diethoxymethylsilyl)propylamine, trimethoxyoctylsilane, triethoxyoctylsilane, 3-aminopropyltriethoxysilane, 4,4,15,15-tetraethoxy-3,16-dioxa-8,9,10,11-tetrathia-4,15-disilaoctadecane, or any combination thereof.

18. The method of claim 1, wherein the water-rich region comprises greater than 50% water and/or aqueous fluids.

19. A method of using a water control treatment agent comprising a substantially anhydrous hydrocarbon carrier and an organosilane in a method of controlling water in a subterranean formation, said method comprising selecting a formation comprising a water-rich region and then contacting said formation with said agent in an amount effective to reduce the water permeability of at least part of said formation, such that water permeability in at least part of said formation is reduced.

20. A method of treating a water and hydrocarbon producing subterranean formation whereby to reduce the amount of water produced therefrom during hydrocarbon recovery, said method comprising:
(a) selecting a formation comprising a water-rich region;
(b) providing a water control treatment agent comprising a substantially anhydrous hydrocarbon carrier and an organosilane; and
(c) contacting said formation with an amount of said agent effective to reduce the amount of water produced therefrom during hydrocarbon recovery.

21. A method of sealing or plugging a water-rich subterranean formation, said method comprising selecting a formation comprising a water-rich region and then contacting said formation with a water control treatment agent which comprises a substantially anhydrous hydrocarbon carrier and an organosilane in an amount effective to reduce the permeability of said formation, such that at least part of the formation is sealed or plugged.

22. A method of sealing or plugging a water-rich subterranean formation, said method comprising contacting said formation with a water control treatment agent which comprises a urease enzyme and a substrate therefor in an amount effective to reduce the permeability of said formation.

23. The method of claim 22, further comprising, before contacting, selecting a formation comprising a water-rich region.

24. A method of controlling water in a subterranean formation, said method comprising selecting a formation producing more water than is necessary for efficient production of hydrocarbon, and contacting said formation with a water control treatment agent which comprises a substantially anhydrous carrier and an organosilane in an amount effective to reduce the water permeability of at least part of said formation.

25. A method as claimed in claim 24, wherein prior to contacting said formation with said water control treatment agent, the ratio of water to hydrocarbon produced is at least 80:20 v/v.

26. A method as claimed in claim 24, wherein the concentration of said organosilane in said carrier is 10 to 50% w/v.

27. A method of controlling water in a subterranean formation, said method comprising contacting said formation with a water control treatment agent which comprises a substantially anhydrous hydrocarbon carrier and an organosilane in an amount effective to reduce the water permeability of at least part of said formation, wherein said water control treatment agent contains less than 10% wt. of polymer material other than that formed by polymerization of the organosilane therein.

28. A method as claimed in claim 27, wherein the concentration of said organosilane in said carrier is 10 to 50% w/v.

* * * * *